Aug. 5, 1924.
C. MACBETH ET AL
1,504,130
MANUFACTURE OF SOLID RUBBER TIRES
Filed June 9, 1919
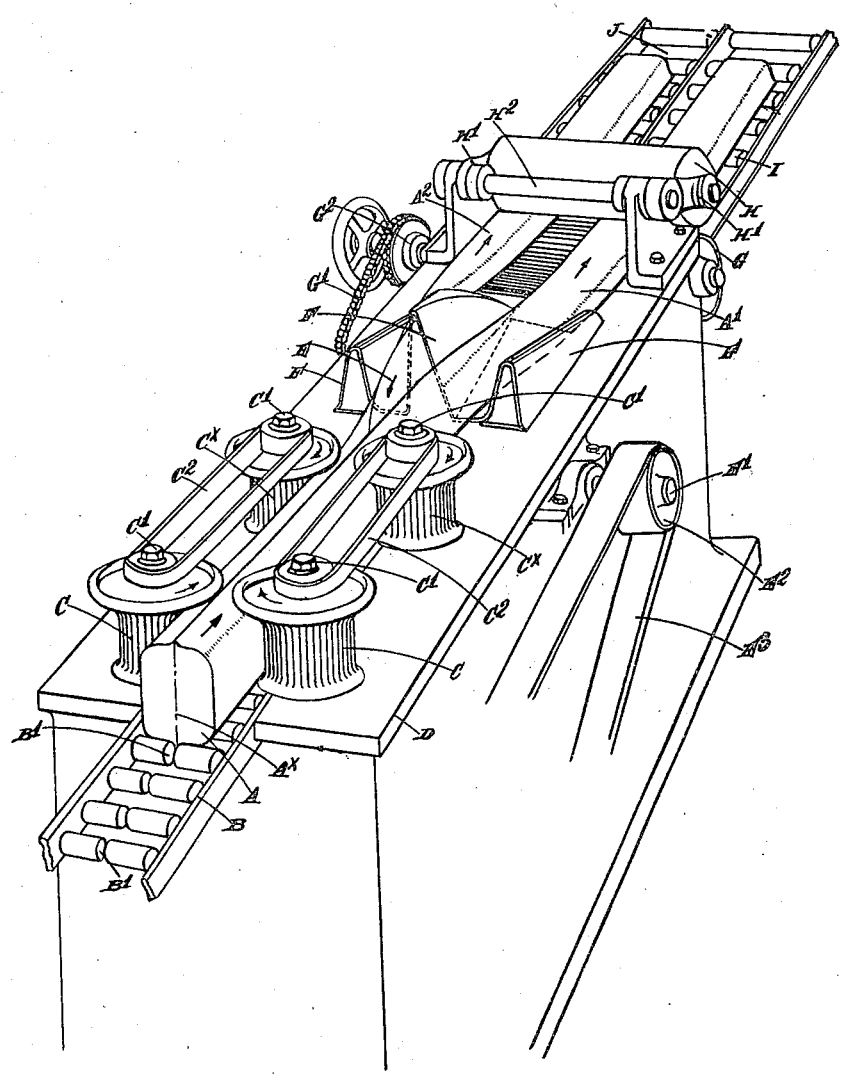

Patented Aug. 5, 1924.

1,504,130

UNITED STATES PATENT OFFICE.

COLIN MACBETH AND HARRY WILLSHAW, OF BIRMINGHAM, ENGLAND, ASSIGNORS TO THE DUNLOP RUBBER COMPANY, LIMITED, OF WESTMINSTER, LONDON, ENGLAND.

MANUFACTURE OF SOLID RUBBER TIRES.

Application filed June 9, 1919. Serial No. 302,921.

*To all whom it may concern:*

Be it known that we, COLIN MACBETH and HARRY WILLSHAW, both subjects of the King of Great Britain, residing at Para Mills, Aston Cross, Birmingham, in the county of Warwick, England, have invented certain new and useful Improvements in or Relating to the Manufacture of Solid Rubber Tires, of which the following is a specification.

This invention relates to the manufacture of solid rubber tires formed by spewing or extruding the rubber through a die so as to form a double tire in one piece or length, that is to say the double tire has the shape of two tires joined together along their bases. The double tire is subsequently divided or split longitudinally into two equal or unequal parts each of which forms a single tire. The chief object of the present invention is to facilitate the longitudinal cutting or splitting of the double tire.

According to this invention, the double tire is fed or moved at the required speed towards a cutter or divider by suitably driven rollers which bear against the double tire so that as it is fed forward, the cutter longitudinally divides or splits it into two parts which form the single tires. The aforesaid rollers may be mounted on rotatable spindles and are readily removable therefrom to enable different shaped or profiled rollers to be used according to the shape and size of the double tire. In some case the rollers may be laterally adjustable either separately or together. The cutter may be of any appropriate construction for example, it may be in the form of a rotating circular or disc knife or it may be in the form of a band knife. The means for driving the aforesaid rollers may be such that the speed of forward movement of the double tire is always in the proper relation to the speed of movement of the knife. The said rollers also ensure that the double tire is fed centrally with respect to the knife and that the two separated portions formed by the cutting operation are moved in parallelism after passing the knife. A device or guard may be arranged in close proximity to the knife and may be of such shape as to constitute a guide which causes the two separated parts or tires to travel on their cut surfaces after passing the knife. In some cases this device need not be employed.

In order that the said invention may be clearly understood and readily carried out, the same will now be described more fully with reference to the accompanying diagrammatic drawing which illustrates in perspective one construction of the improved apparatus for cutting or splitting a double tire into two tires of same size and shape.

A represents the spewed double tire which is supported on a roller track B in a position in which the line $A^x$ representing the joined bases of the two tire portions is vertically disposed. The rollers of the track B are recessed at B' to receive the lower ridge adjacent to the line $A^x$ where the double tire is slightly wider than the other parts when the tires are to be formed with wide bases. The double tread A is fed or moved along the track B by hand to the two pairs of rollers C C and $C^x C^x$ on the table D of the frame of the apparatus. As shown, two rollers C, $C^x$ are disposed on each side of the double tread and are so formed as to bear against and embrace the double tire. The several rollers are detachably mounted on spindles C' rotated by appropriate means in order to impart rotation to the said rollers which thereby cause the forward movement of the double tire. The spindles of the pair of rollers C may be positively driven and each of these spindles imparts rotation to the spindles of the roller $C^x$ on the same side of the double tire by means of bands $C^2$. Owing to the rollers being detachably secured to the spindles various shaped or profiled rollers can be readily applied to the spindles to suit different sizes or shapes of double tires. The rollers may if desired be laterally adjustable either separately or together, for example, the spindles of each pair of rollers C C and $C^x C^x$ may be moved as required to adjust the rollers by means of a right and left hand screw. This adjustment of the rollers is some times necessary as for example in cases dealing with tires made from different rubber mixings when slightly different rollers may be required according to the rubber mixing. In such cases it is easier to adjust the rollers than to remove and replace them by different rollers. The knife E which, as shown, is in the form of a disc is mounted on a horizontal shaft E' so as to rotate in a vertical plane and effect the splitting or dividing of the double tire along the line $A^x$ at a position where the double tire emerges from between the rollers C× as the double tire is fed forward in the manner aforesaid. The shaft E' of the cutting knife may be driven by a pulley E² and a belt E³ as shown and if desired, suitable gearing may connect the shaft E' to the spindles of the rollers C in order to effect the positive rotation of these spindles. The speed of rotation of the rollers and consequently the speed of forward movement of the double tire are so chosen as to be in proper relation to the speed of rotation of the knife E and the rollers also maintain the double tire in the correct position relatively to the knife. The knife, however, may be adjusted laterally if required in order to obtain even or equal splitting of the double tire. In order to facilitate the cutting operation, water is supplied to the knife by any appropriate means not illustrated in the drawing. In the example shown the upper part of the knife is covered by a shield or guard F which is so shaped that the separated parts A' A² of the double tire in passing one on each side of the knife are guided so as to assume gradually a position in which they lie on their cut faces which represent the bases of the two tires A' A² formed by the cutting operation. After the two separated parts forming the single tires have passed the knife, they pass between superposed take-up rollers G. H the lower one G of which is positively driven from the shaft E' through chain gearing G' and a friction clutch G², whilst the upper roller H which may be weighted is carried by movable or swinging levers H' mounted on a rod H² so that the upper roller rests or bears upon the upper surface of the two tires and by reason of its weight enables the two tires to be gripped between the two rollers G. H. The mounting of the upper roller H in the manner aforesaid permits of the rollers bearing and exerting a grip on any height or depth of tire. These rollers G. H. thus exert a pull on the two tires A' A² and therefore enable the forward movement of the two tires to be effected after the length of double tire has emerged from between the rollers C× so that the whole length of double tread may be cut and the separated parts fed forward on to and along the tracks I. J. as shown. The guide F can be dispensed with if desired. Instead of employing a circular rotating knife as shown, a band knife may be employed which is adapted to be moved by means of suitable rollers and is mounted in such position that a portion of the band knife is disposed in a vertical plane which portion effects the cutting or splitting of the double tire.

What we claim and desire to secure by Letters Patent of the United States is:—

1. An apparatus of the class described comprising means for guiding and feeding a double solid rubber tire, a base for supporting the tire in its travel, a cutter positioned in the path of travel of a tire placed in said apparatus and adapted to divide the tire through its longitudinal center, and means for turning each of the sections thus formed about an axis parallel with its path of travel to cause it to move resting upon its cut surface.

2. An apparatus of the class described comprising means for guiding and feeding a double solid rubber tire, a base for supporting the tire in its travel, a cutter positioned in the path of travel of a tire placed in said apparatus and adapted to divide the tire through its longitudinal center, and a guard around said cutter for turning each of the sections about an axis parallel with its path of travel to cause it to rest upon its cut surface.

3. An apparatus of the class described comprising a bed adapted to support a double solid rubber tire, adjacent rollers having grooved peripheries and adapted to guide a tire passing between them, spindles for supporting said rollers and upon which said rollers are detachably mounted, means for rotating said rollers, means for turning each of the sections thus formed about an axis parallel with its path of travel, and a cutter positioned in the path of travel of a tire passed between said rollers and adapted to divide a tire through its longitudinal center.

4. An apparatus of the class described comprising a bed adapted to support a double solid rubber tire, adjacent rollers having grooved peripheries and adapted to guide a tire passing between them, spindles for supporting said rollers and upon which said rollers are detachably mounted, means for rotating said rollers, a cutter positioned in the path of travel of a tire passed between said rollers and adapted to divide a tire through its longitudinal center, and means for turning the sections thus formed about axes parallel with their respective paths of travel to cause them to move forward upon their cut surfaces.

5. An apparatus of the class described comprising a bed adapted to support a double solid rubber tire, adjacent rollers having grooved peripheries and adapted to guide a tire passing between them, spindles for supporting said rollers and upon which said rollers are detachably mounted, means for rotating said rollers, means for turning each of the sections thus formed about an axis parallel with its path of travel, and a laterally adjustable cutter positioned in the path of travel of a tire passed between said rollers and adapted to divide a tire through its longitudinal center.

6. Apparatus of the class described, comprising means for guiding and supporting a rubber strip or section having the form of two solid tires with their bases adjoining, means for cutting said strip longitudinally along a line representing the adjoining bases of the two tires to form two single tire strips and means for guiding and maintaining the cut or divided tire strips separated from each other after passing the cutting means.

7. Apparatus of the class described, comprising means for guiding and supporting a rubber strip or section having the form of two solid tires with their bases adjoining, means for cutting said strip longitudinally along a line representing the adjoining bases of the two tires to form two single tire strips, means for guiding and maintaining the cut or divided tire strips separated from each other after passing the cutting means, and common take up means for engaging with the separated strips.

8. Apparatus of the class described, comprising a series of rollers for guiding a double tire strip, a circular rotary knife disposed in close proximity to said rollers and adapted to cut the double strip longitudinally along a vertical and medial line, guiding means for changing the position of the cut strips so that the cut surfaces are horizontally disposed, and means for causing said cut strips to travel forward on their horizontal or cut surfaces.

9. Apparatus of the class described comprising a set of vertical rollers for guiding a double tire strip, a cutting knife in close proximity to the end guiding rollers and adapted to cut the double tire strip into two tire strips, horizontal rollers for receiving the cut tire strips after passing the cutting knife, and means for guiding said cut tire strips to said horizontal rollers.

COLIN MACBETH.
HARRY WILLSHAW.